US012691914B2

(12) United States Patent　　　(10) Patent No.:　US 12,691,914 B2
Eger-Hübel et al.　　　　　　　(45) Date of Patent:　　　Jul. 28, 2026

(54) UNDERFRAME FOR A RAIL VEHICLE CAR BODY

(71) Applicant: Siemens Mobility Austria GmbH, Vienna (AT)

(72) Inventors: Clemens Eger-Hübel, Vienna (AT); Michael Diem, Graz (AT)

(73) Assignee: Siemens Mobility Austria GmbH, Vienna (AT)

( * ) Notice: Subject to any disclaimer, the term of this patent is extended or adjusted under 35 U.S.C. 154(b) by 825 days.

(21) Appl. No.: 17/921,715

(22) PCT Filed: Apr. 21, 2021

(86) PCT No.: PCT/EP2021/060409
§ 371 (c)(1),
(2) Date: Oct. 27, 2022

(87) PCT Pub. No.: WO2021/219464
PCT Pub. Date: Nov. 4, 2021

(65) Prior Publication Data
US 2023/0159066 A1　　May 25, 2023

(30) Foreign Application Priority Data
Apr. 29, 2020　(AT) ............................... A 50365/2020

(51) Int. Cl.
*B61F 1/12*　　　(2006.01)
*B62D 21/02*　　(2006.01)
*B61D 17/12*　　(2006.01)
(52) U.S. Cl.
CPC ............... *B61F 1/12* (2013.01); *B62D 21/02* (2013.01); *B61D 17/12* (2013.01)

(58) Field of Classification Search
CPC ... B61D 17/12; B61F 1/12; B61F 1/08; B61F 1/14; B62D 21/02
See application file for complete search history.

(56) References Cited

U.S. PATENT DOCUMENTS

| | | | | | |
|---|---|---|---|---|---|
| 2,575,454 | A | * | 11/1951 | Kuhler | .................. B61D 17/043 |
| | | | | | 52/204.595 |
| 2,700,551 | A | * | 1/1955 | Stump | .................... B62D 21/02 |
| | | | | | 280/800 |

(Continued)

FOREIGN PATENT DOCUMENTS

| | | |
|---|---|---|
| CN | 2196141 | 5/1995 |
| CN | 2460611 | 11/2001 |

(Continued)

OTHER PUBLICATIONS

PCT International Search Report dated Aug. 3, 2021 based on PCT/EP2021/060409 filed Apr. 21, 2021.

*Primary Examiner* — Cheng Lin
(74) *Attorney, Agent, or Firm* — Cozen O'Connor

(57)　　　　ABSTRACT

An underframe for a rail vehicle car body includes a plurality of longitudinal support members oriented in the longitudinal direction of the underframe, and at least one transverse support member which, in the fitted position is oriented perpendicular to the longitudinal support members, wherein the longitudinal support members each have an opening at the level of the mounting position of the transverse member through which the transverse member can be inserted.

8 Claims, 6 Drawing Sheets

(56) References Cited

U.S. PATENT DOCUMENTS

| | | | | |
|---|---|---|---|---|
| 2,946,297 | A | 7/1960 | Dean et al. | |
| 4,093,253 | A | 6/1978 | Lehr | |
| 4,662,650 | A * | 5/1987 | Angehrn | B62D 33/044 |
| | | | | 280/789 |
| 2005/0178285 | A1 * | 8/2005 | Beers | B61D 17/18 |
| | | | | 105/404 |
| 2020/0023469 | A1 | 1/2020 | Han et al. | |

FOREIGN PATENT DOCUMENTS

| | | | | |
|---|---|---|---|---|
| CN | 101088831 | | 12/2007 | |
| CN | 104097654 | | 10/2014 | |
| CN | 110155096 | | 8/2019 | |
| EP | 0186625 | | 7/1986 | |
| EP | 0962373 | A1 * | 12/1999 | B61D 17/10 |
| EP | 3348455 | | 7/2018 | |
| EP | 3348455 | A1 * | 7/2018 | B62D 21/20 |
| FR | 2334552 | | 7/1977 | |
| JP | S5880373 | | 5/1983 | |
| TW | 456400 | | 9/2001 | |
| WO | 9808725 | | 3/1998 | |
| WO | WO-9808725 | A1 * | 3/1998 | B62D 65/00 |
| WO | 2011038755 | | 4/2011 | |
| WO | WO-2011038755 | A1 * | 4/2011 | B61D 17/08 |

* cited by examiner

UNDERFRAME FOR A RAIL VEHICLE CAR BODY

CROSS-REFERENCE TO RELATED APPLICATIONS

This is a U.S. national stage of application No. PCT/EP2021/060409 filed 21 Apr. 2021. Priority is claimed on Austrian Application No. A50365/2020 filed 29 Apr. 2020, the content of which is incorporated herein by reference in its entirety.

BACKGROUND OF THE INVENTION

1. Field of the Invention

The invention relates to an underframe for a rail vehicle car body.

2. Description of the Related Art

According to the prior art, rail vehicles are constructed from prefabricated large subassemblies, such as side and end walls and a roof, which are connected to a further large subassembly, the underframe. The underframe is designed to transmit the weight loads of the vehicle and the payload into the trucks and must transmit the tensile and compressive forces occurring during operation to additional coupled vehicles in the longitudinal direction. For this purpose, the underframe is usually constructed as a lattice-type structure of longitudinal and transverse support members, where particularly stable main transverse support members are usually arranged in the region of the trucks. The longitudinal support members are often designed as so-called central longitudinal support members, four individual longitudinal support members, for example, being provided, which run along the longitudinal extent of the underframe. In addition, one lateral longitudinal support member is usually provided on each longitudinal side, into which support members the forces from the side walls are introduced. In such a design, the longitudinal support members are made as far as possible in one piece, without interruption, and thus extend over the entire length of the vehicle, or at least between the main transverse support members. Here, the transverse support members extend between the lateral longitudinal support members transversely to the longitudinal direction of the underframe. The longitudinal support members are designed to absorb greater forces than the transverse support member. As a result, the longitudinal support members are preferably designed to be uninterrupted and the transverse support members are made from individual sections that are fitted into the spacings between the longitudinal support members and are connected thereto. This method of manufacture requires a large outlay in terms of auxiliary devices for the exact positioning of the transverse support members, via which the longitudinal support members are held in their intended position and which likewise predetermine the assembly position of the transverse support member sections. Changes to a vehicle design thus also necessitate extensive changes to these auxiliary devices.

SUMMARY OF THE INVENTION

In view of the foregoing, it is therefore an object of the invention to provide an underframe that is quicker and simpler to construct than conventional underframes and in which the positioning of the transverse support members with respect to the longitudinal support members is to be accomplished in a substantially simplified manner and without auxiliary devices.

This and other objects and advantage are achieved in accordance with the invention by an underframe for a rail vehicle car body is described, where the underframe comprises a plurality of longitudinal support members, which are oriented in the longitudinal direction of the underframe, and includes at least one transverse support member, which in the fitted position is oriented perpendicularly to the longitudinal support members, and where the longitudinal support members each have, at the assembly position of the transverse support member, an opening through which the transverse support member can be inserted.

This makes it possible to achieve the advantage of being able to make the transverse supports in one piece without dividing them, and of being able to specify their assembly position by the positioning of the openings in the longitudinal support members, for which purpose additional auxiliary devices are no longer required.

In accordance with the invention, a lattice-type structure is constructed from longitudinal and transverse support members, in which the transverse support members pass through the longitudinal support members at predetermined positions. Here, it is particularly advantageous to construct the openings in the longitudinal support members in such a way that a transverse support member can only be pushed through the openings in one specific position, in particular in a position that deviates from its final assembly position, and can subsequently be rotated into its final assembly position in these openings. In this way, the openings in the longitudinal support members can be made smaller, ensuring that the strength of the longitudinal support members is not excessively weakened.

It is furthermore advantageous to provide the transverse supports with apertures which, during the rotation process to reach the final assembly position, engage with the longitudinal support member and, after completion of this rotation process, produce a positive connection between the longitudinal support member and the transverse support member. These apertures also determine the position of the longitudinal support members relative to one another in the transverse direction of the underframe, and therefore there is also no need for auxiliary devices to align the longitudinal support members at the start of the assembly process. The distances between the apertures on the transverse support members thus determine the distances between the longitudinal support members.

Subsequently, the longitudinal support members can be permanently connected to the transverse support members at the respective points of intersection, for which purpose a welding process can preferably be used.

The transverse support members and the longitudinal support members should preferably be manufactured from metal; in particular, it is advantageous to manufacture them from bent sheet metal with a U- or Z-shaped cross section since these shapes have a high strength with a low mass. Manufacture from sheet metal also permits simple and low-cost production of the apertures in the longitudinal support members and of the grooves in the transverse support members.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE EXEMPLARY EMBODIMENTS

Figure 1:
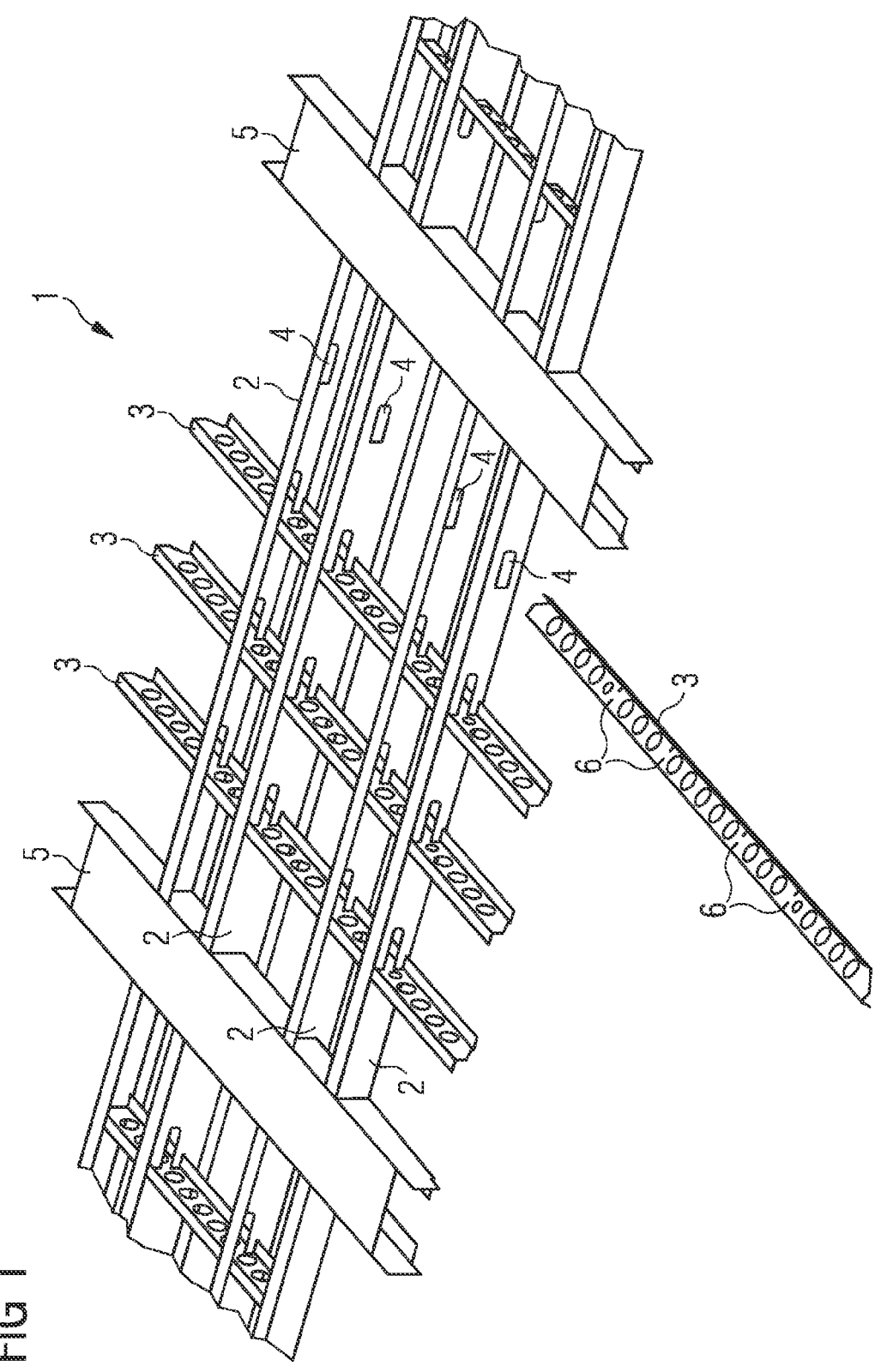
FIG. 1 shows an underframe, first assembly step in accordance with the invention.

FIG. 1 schematically shows an exemplary underframe during a first assembly step of a transverse support member. It illustrates a section of an underframe 1, which is constructed as a typical lattice structure consisting of longitudinal support members 2, transverse support members 3 and two main transverse support members 5. The section between the two main transverse support members 5 is shown, in which four longitudinal support members 2 extend in parallel between the main transverse support members 5 in the longitudinal direction of the underframe 1. Arranged in this section are four transverse support members 3, which extend perpendicularly to the longitudinal direction of the underframe 1. Three of the transverse support members 3 are in their final assembly position, and one transverse support member 3 is situated next to the underframe 1 and is ready to be brought into its final assembly position.

The longitudinal support members 2 are provided with apertures 4, through which a transverse support member 3 can be inserted. These apertures 4 are dimensioned such that a transverse support member 3 can only be introduced into the aperture 4 in a position in which it is rotated with respect to the final assembly position. The transverse support members 3 have grooves 6 in the form of elongate depressions, which are structured to engage in the longitudinal support members 2. The distances between the grooves 6 correspond to the intended distance between the longitudinal support members 2, and therefore they simultaneously also determine the distances between the longitudinal support members 2 during the mounting of the transverse support members 3. As a result, special auxiliary devices for the exact alignment and spacing of the longitudinal support members 2 can be dispensed with.

Figure 2:
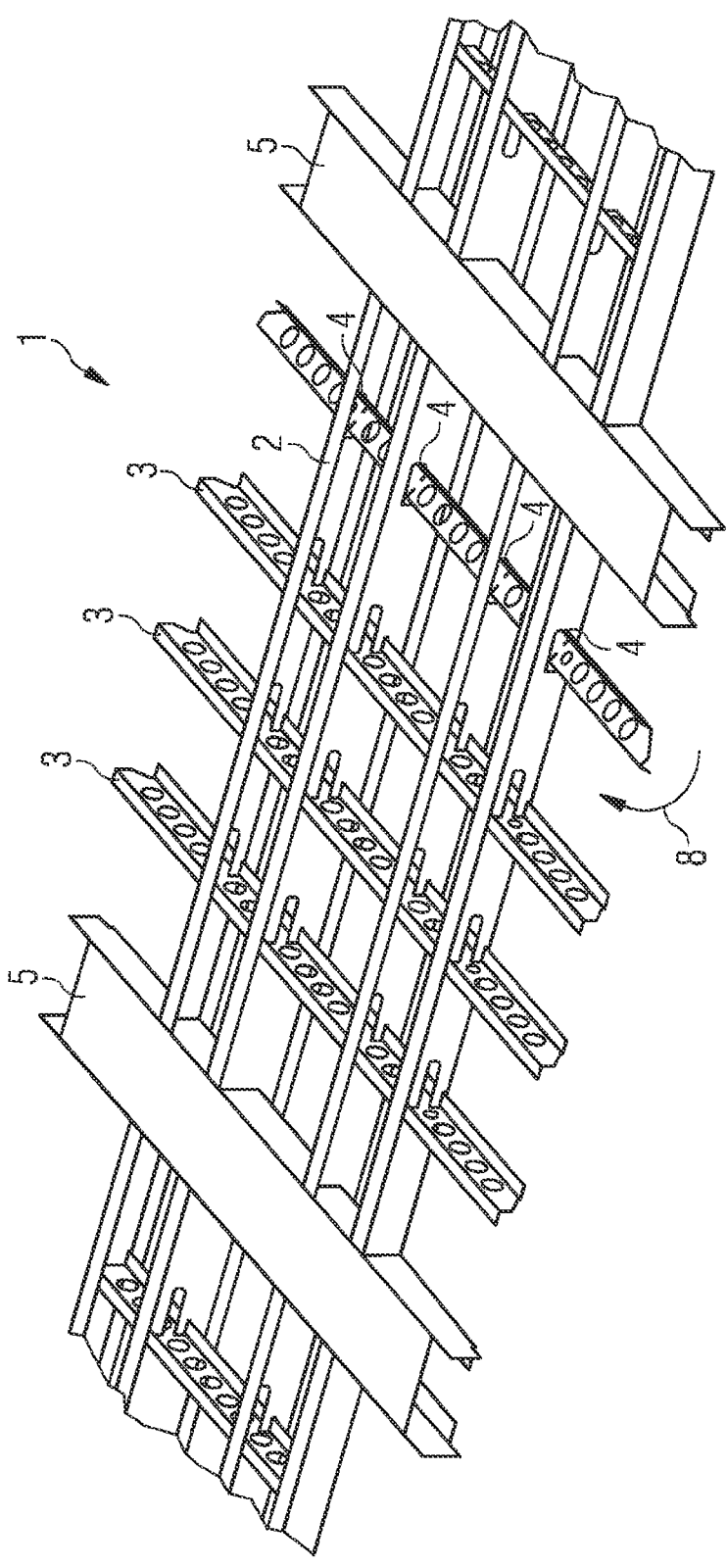
FIG. 2 shows the underframe, second assembly step in accordance with the invention.

FIG. 2 schematically shows an exemplary underframe during a second assembly step of a transverse support member. The underframe 1 from FIG. 1 is illustrated, where the transverse support member 3 located outside the underframe 1 in FIG. 1 is now introduced into the apertures 4 of the longitudinal support members 2. The apertures 4 are shaped such that the strength of the longitudinal support members 2 is weakened as little as possible, and in this case they have a contour line such that the longitudinal support member 3 can only be introduced in a position in which it is rotated with respect to its final assembly position. With a rotary movement 8, a transverse support member 3 introduced in this way is subsequently brought into its final assembly position. Simultaneously with this rotary movement 8, the grooves 6 engage in the longitudinal support members 2.

Figure 3:
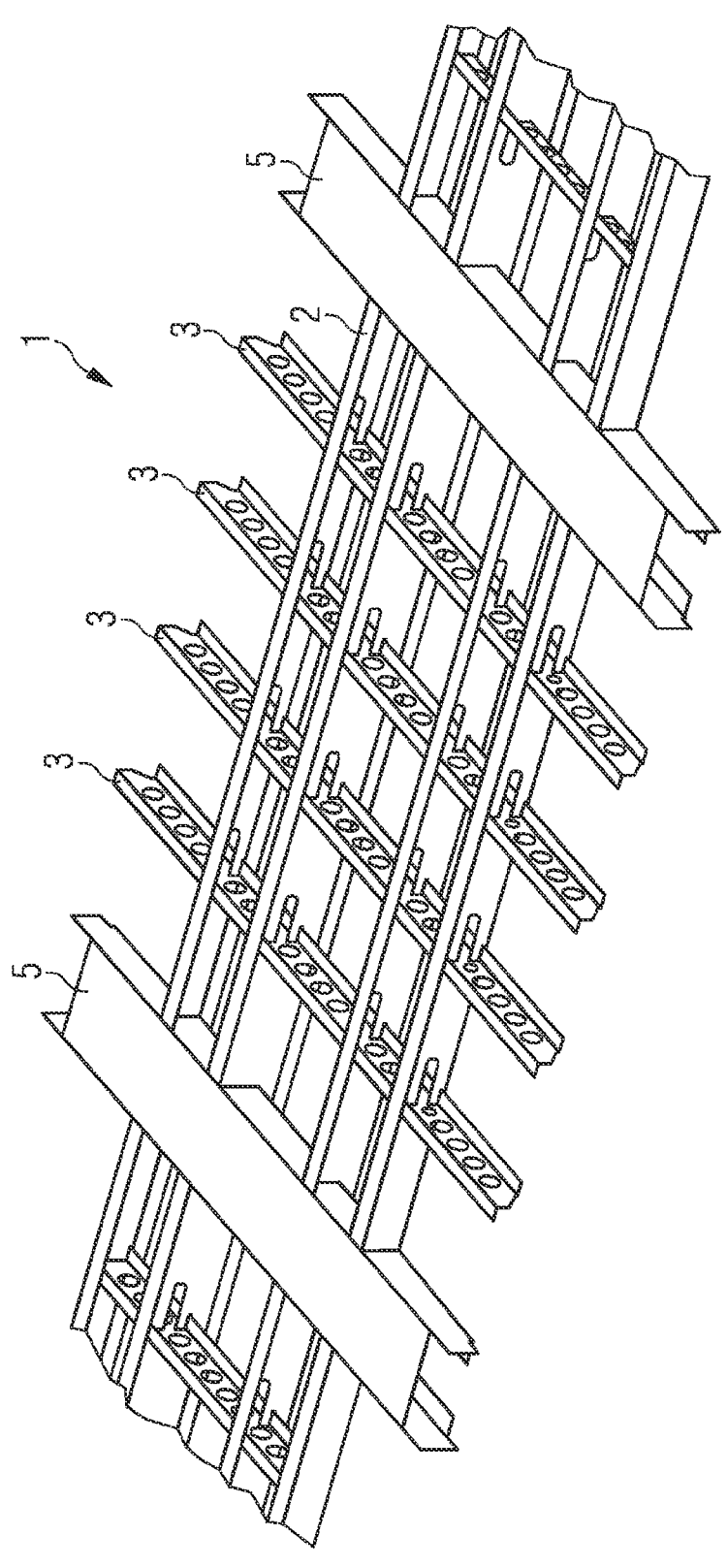
FIG. 3 shows the underframe, third assembly step in accordance with the invention.

FIG. 3 schematically shows an exemplary underframe during a third assembly step of a transverse support member. In this third assembly step, the transverse support member 3 is rotated into its final assembly position and connected positively to the longitudinal support members. Thus, the position of the longitudinal support members 2 relative to the transverse support members 3 is given and the components mentioned can be firmly connected to one another, for which purpose a welding process is expediently to be used.

Figure 4:
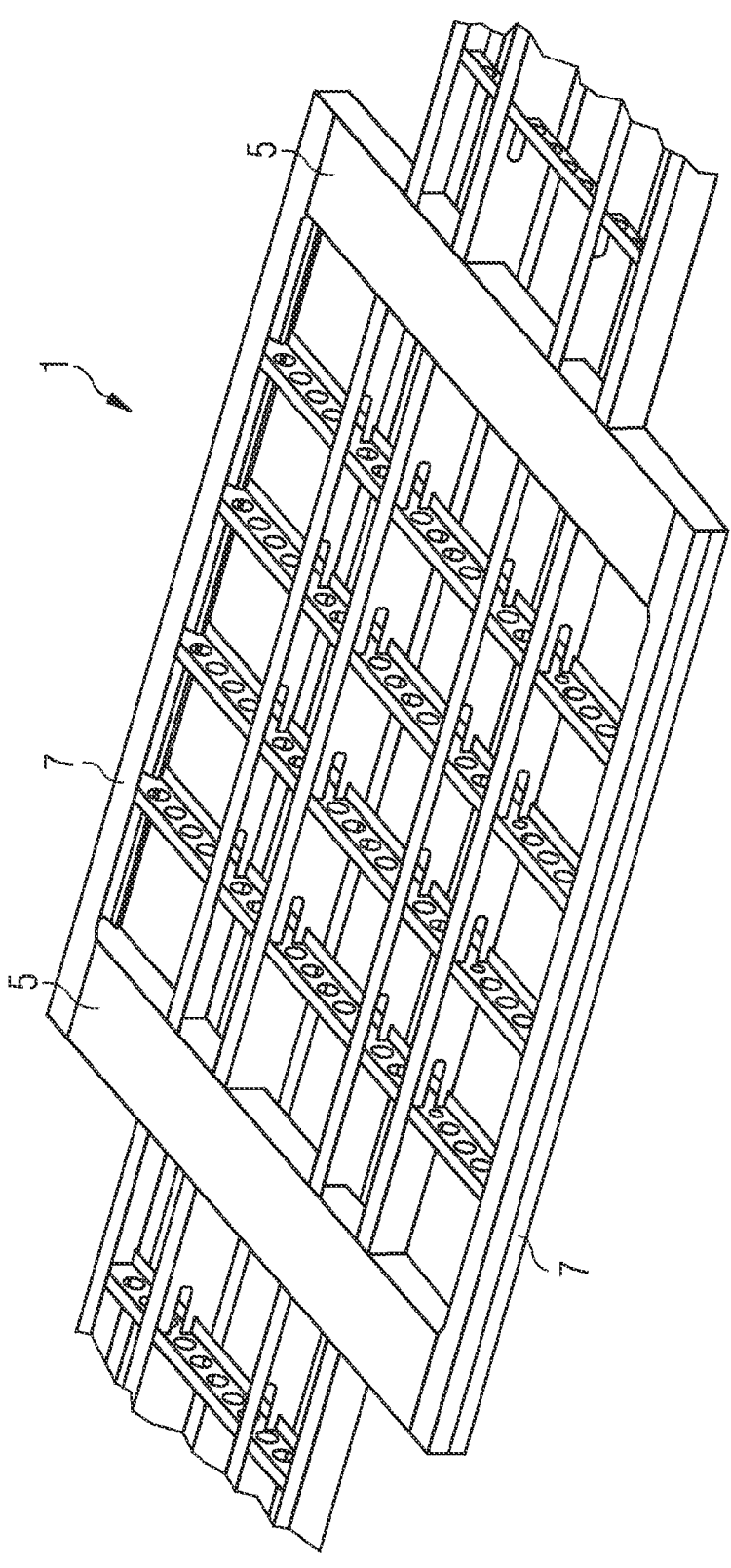
FIG. 4 shows the underframe with lateral longitudinal support member in accordance with the invention.

FIG. 4 schematically shows an exemplary underframe with lateral longitudinal support members. In a further continuation of the production of an underframe, as shown in FIGS. 1 to 3, the use of lateral longitudinal support members 7 can be envisaged. These lateral longitudinal support members 7 increase the stability of the underframe 1 and facilitate the further assembly of a car body based on the underframe 1, in particular by simplifying the mounting of side walls. In the exemplary illustrated embodiment, the lateral longitudinal support members 7 extend along the lateral boundary of the underframe 1 between the two main transverse support members 5 and connect the ends of the transverse support members 3.

Figure 5:
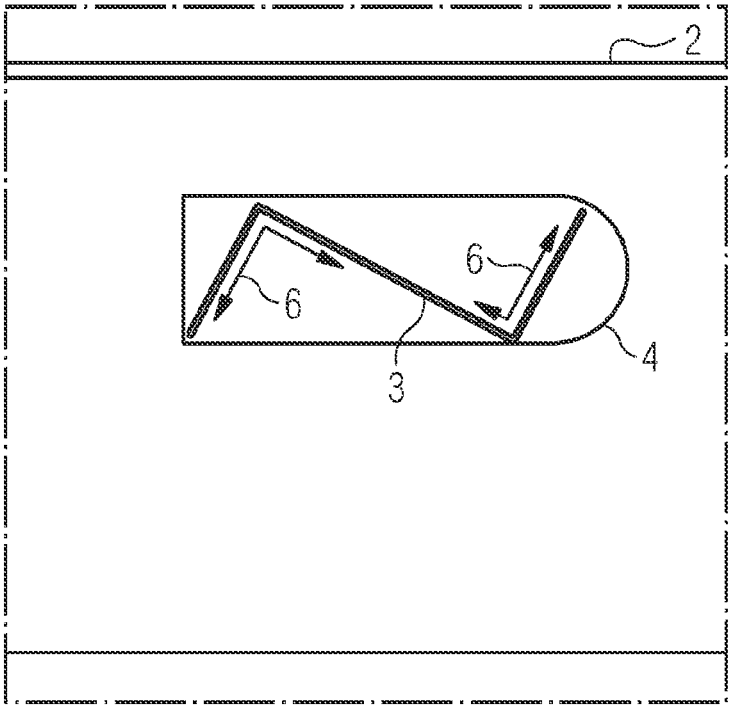
FIG. 5 shows an aperture with a transverse support member in accordance with the invention.

FIG. 5 schematically shows an exemplary aperture with a transverse support member. A view of a longitudinal support member 2 with an aperture 4 is illustrated, where a transverse support member 3 is introduced into this aperture 4. The transverse support member 3 is structured as a metal profile with a z-shaped cross section and is provided with grooves 6. The section through the transverse support member 3 is shown by a groove 6, where the depth of this elongate notch is visible.

Figure 6:
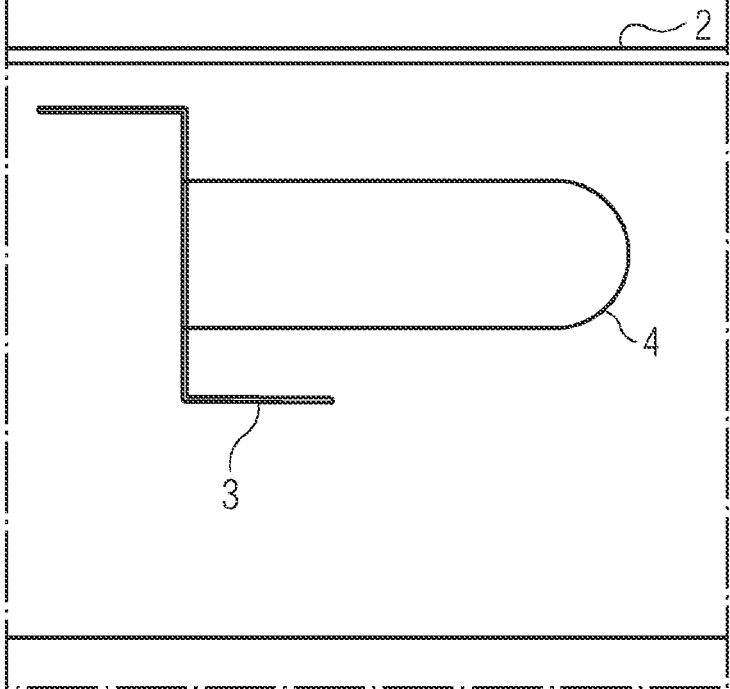
FIG. 6 shows an aperture with a transverse support member in the final assembly position in accordance with the invention.

FIG. 6 schematically shows an exemplary aperture with a transverse support member in the final assembly position. The example from FIG. 5 is illustrated, where the transverse support member 3 has been rotated into its final assembly position. The grooves 6 engage in the web of the longitudinal support member 2 and produce a positive connection to the latter.

Figure 7:
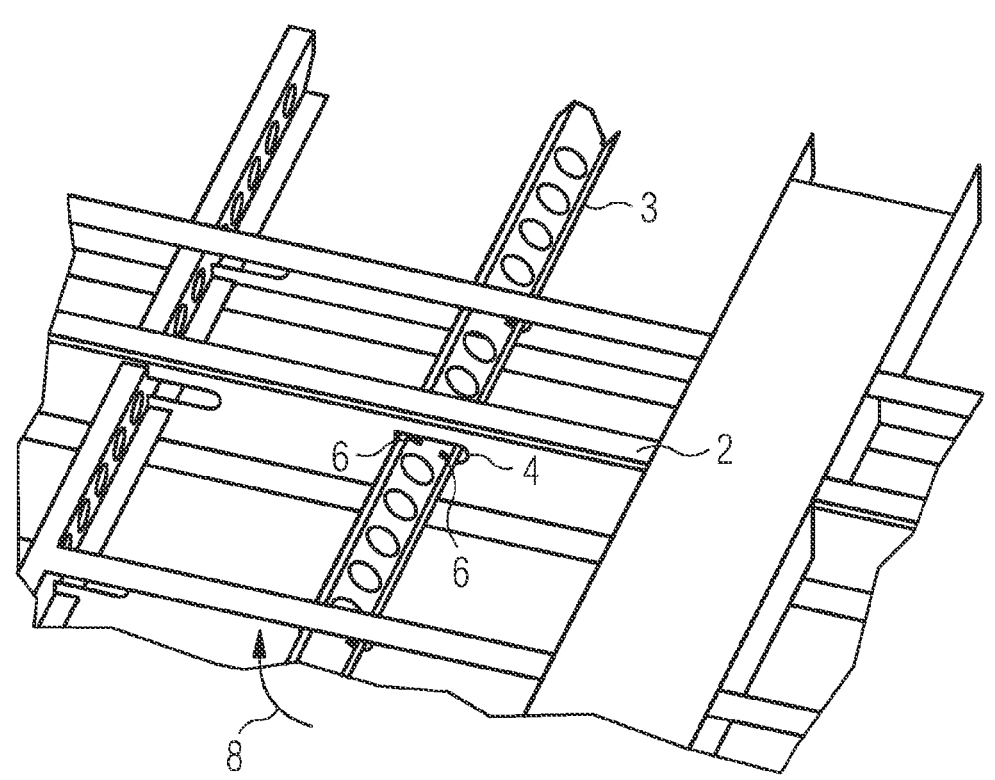
FIG. 7 shows a detailed view of the underframe in accordance with the invention.

FIG. 7 schematically shows an exemplary underframe in a detail view. The underframe 1 from FIGS. 1 to 4 is illustrated in a detail view of a point of intersection between a longitudinal support member 2 and a transverse support member 3, where the transverse support member 3 is still to be moved into its final assembly position via a rotary movement 8.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An underframe for a rail vehicle car body, comprising:
a plurality of longitudinal support members oriented in a longitudinal direction of the underframe; and
at least one transverse support member, which in the fitted position is oriented perpendicularly to the longitudinal support members;
wherein each longitudinal support member of the plurality of longitudinal support members includes, at an assembly position of the at least one transverse support member, an opening through which the at least one transverse support member is insertable;
wherein the at least one transverse support member is rotatable about its longitudinal axis in respective openings of the longitudinal support member; and
wherein the at least one transverse support member is at a final assembly position after completion of a rotary movement about its longitudinal axis.

2. The underframe for a rail vehicle car body as claimed in claim 1, wherein the at least one transverse support member comprises grooves which are positively connected to the plurality of longitudinal support members in the final assembly position.

3. The underframe for a rail vehicle car body as claimed in claim 2, wherein the transverse support member is formed as a metal profile with a z-shaped cross section.

4. The underframe for a rail vehicle car body as claimed in claim 2, wherein each longitudinal support member of the plurality of longitudinal support members is connected to the at least one transverse support member via a welding process at points of intersection with said at least one transverse support member.

5. The underframe for a rail vehicle car body as claimed in claim 1, wherein the transverse support member is formed as a metal profile with a z-shaped cross section.

6. The underframe for a rail vehicle car body as claimed in claim 5, wherein each longitudinal support member of the plurality of longitudinal support members is connected to the at least one transverse support member via a welding process at points of intersection with said at least one transverse support member.

7. The underframe for a rail vehicle car body as claimed in claim 1, wherein each longitudinal support member of the plurality of longitudinal support members is connected to the at least one transverse support member via a welding process at points of intersection with said at least one transverse support member.

8. The underframe for a rail vehicle car body as claimed in claim 1, wherein a plurality of transverse support members is provided which each extend over a width of the underframe; and wherein each end of the transverse support member of the plurality of transverse support members is connected to a lateral longitudinal support member on each side.

* * * * *